United States Patent Office 3,488,373
Patented Jan. 6, 1970

---

3,488,373
PROCESS FOR PREPARING BETA-AMINO-
ETHYLTHIOALKYLSILANES
Abe Berger, Schenectady, N.Y., assignor to General
Electric Company, a corporation of New York
No Drawing. Filed Dec. 26, 1967, Ser. No. 693,134
Int. Cl. C07f 7/02, 7/18; C09g 1/06
U.S. Cl. 260—448.2                 3 Claims

ABSTRACT OF THE DISCLOSURE

The disclosure relates to compounds within the scope of the following formula:

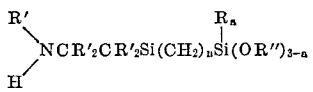

where R'' is an alkyl or aryl radical, R is an organic radical, R' is an H or R radical, $a$ is equal to 0 to 2, inclusive, and $n$ has a value of 1 to 10. Compounds within the scope of the above formula can be made by reacting a compound within the scope of the formula:

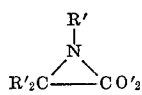

with a compound within the scope of the formula:

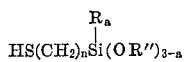

The compounds are useful in detergent resistant auto polishes.

---

This invention relates to novel thioether silanes having an amine group on the carbon atom which is beta to the thioether linkage. The thioether linkage is attached to the silicon atom through an alkylene chain having 1 to 10 carbon atoms.

The compositions of the present invention are useful in polish compositions where it is desirable to combine ease of rub-out, high gloss, detergent resistance, and anti-oxidant properties.

The aminoethyl thioalkylsilanes containing one or more hydrolyzable alkoxy or aryloxy radicals of the present invention can be chemically incorporated into polysiloxane fluid compositions which in turn can be incorporated into polish compositions to give enhanced and unexpected properties to the polish. For example, the compositions made from the compounds of the present invention give the ease of rub-out characteristic of the polydimethylsiloxy fluids which have long been used in polish compositions and in addition provide a gloss far superior to that provided by prior art compositions. In addition to the gloss, the compounds of the present invention, when incorporated into a siloxane fluid and used in a polish composition, impart detergent resistance to the polish composition and in addition act as surface antioxidants.

When the polish formulation contains silanol substituted polysiloxanes, the compositions of the present invention act as a catalyst in the polymerization of such polysiloxane on the surface which has been polished to form a clear, insoluble high luster film.

Other uses of the compositions of the present invention include leveling agents in floor polishes, as antistatic treating agents, as adhesives for bonding latex coagulant to glass, and as curing agents for room temperature vulcanizing polysiloxanes.

The aminoethylthioalkylsilanes of the present invention are represented by the formula:

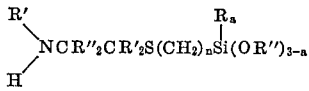

where R is an organic radical attached to silicon by a carbon to silicon bond and is selected from the class consisting of monovalent hydrocarbon radicals free of aliphatic unsaturation, halogenated monovalent hydrocarbon radicals free of aliphatic unsaturation, and cyanoalkyl radicals, R' is selected from the class consisting of H and R radicals, R'' is a group selected from the class consisting of lower alkyl radicals having one to seven carbon atoms and mononuclear aryl radicals, such as phenyl, $n$ is an integer having a value of 1 to 10.

More particularly, radicals represented by R include alkyl radicals, e.g., methyl, ethyl, propyl, isopropyl, butyl, octyl, etc. radicals; cycloalkyl radicals, e.g., cyclopentyl, cyclohexyl, cycloheptyl, etc. radicals; aryl radicals, e.g., phenyl, naphthyl, tolyl, xylyl, etc. radicals; aralkyl radicals, e.g., benzyl, phenylethyl, phenylpropyl, etc. radicals; halogenated derivatives of the above radicals, including chloromethyl, chloropropyl, trifluoromethyl, chlorophenyl, dibromophenyl, tetrachlorophenyl, difluorophenyl, etc. radicals; and cyanoalkyl radicals, e.g., beta-cyanoethyl, gamma-cyanopropyl, beta-cyanopropyl, etc. radicals.

Illustrative of the R'' groups of the present invention are lower alkyl radicals having 1 to 7 carbon atoms, mononuclear aryl radicals and halogenated derivatives thereof, e.g., methyl, ethyl, isopropyl, chlorobutyl, tert-pentyl, hexyl, bromoheptyl, phenyl, and para-chlorophenyl groups.

Illustrative of the compounds of this invention are gamma - (aminoethylthio)propyltrimethoxysilane of the formula:

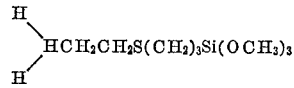

omega - (aminoethylthio)octylethoxydimethylsiloxane of the formula:

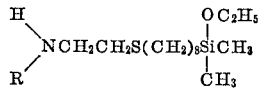

beta-(methylaminoethylthio)ethyltrimethoxysilane of the formula:

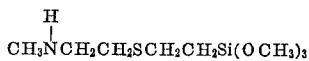

and gamma - (2'-amino-n-butylthio)propyltriethoxysilane of the formula:

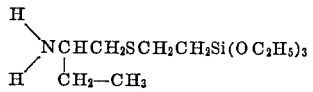

The compounds of the present invention are made by reacting ethyleneimine or a substituted ethyleneimine of the formula:

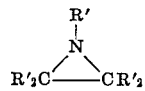

with a mercaptoalkylsilane of the formula:

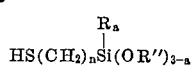

in the presence of a basic catalyst to produce a compound within the scope of Formula 1. In the above formulas R, R'', $a$ and $n$ are as previously defined.

In carrying out the reaction, one merely mixes the reactants with a basic catalyst, heats the reaction mixture to reflux with stirring and the reaction proceeds. The reaction is very straightforward with no appreciable side reactions or by-product and the yields are often almost quantitative.

The basic catalysts which can be employed are at least slightly soluble in the reaction mixture. These basic catalysts include, for example, alcoholates, such as sodium methylate, sodium ethylate, lithium ethylate, etc.; tertiary amines, e.g., trimethylamine; tri-n-butylphosphine, triphenylphosphine; alkali metal amides, such as sodamide, alkali metal silanolates, and alkali metal carbonates. Alkali metal hydroxides are not recommended because they may cause cleavage of alkoxy groups from the silicon atom.

In order that those skilled in the art might better understand how the present invention may be practiced, the following examples are given by way of illustration and not by way of limitation.

Example 1

A reaction mixture of 19.6 grams of mercaptopropyltrimethoxysilane, one-half ml. of a 40% aqueous solution of benzyltrimethylammonium hydroxide and 4.3 grams of ethyleneimine was heated with stirring to reflux, 70–75° C., and maintained at reflux for 4 hours. Care was exercised to avoid vapors entering the laboratory because ethyleneimine is a toxic material. An additional quantity, 2.6 grams, of ethyleneimine was added and the reaction mixture was maintained at reflux for an additional two hours. Fractionation of the product produced gamma - (aminoethylthio)propyltrimethoxysilane, B.P. 112–113° C./0.5 mm. in a 92% yield. An I.R. scan of the product showed the typical amine peaks at 3.05 microns and 6.3 microns. The —S—CH$_2$— peak is also present at 8.05 microns. The ≡SiOCH$_3$ absorption is present at 3.55 microns, 8.5 microns and 9.3 microns. A VPC scan of the product shows a purity of 99%.

Example 2

A reaction mixture consisting of 10 grams of mercaptooctylethoxydimethylsilane, 1.8 grams of ethyleneimine, and 0.5 gram of sodium ethoxide was heated to reflux. The reaction mixture was maintained at reflux for 4 hours. A VPC scan of the reaction showed complete consumption of starting materials. Fractionation produced omega-(aminoethylthio)octylethoxydimethylsilane of the formula:

$$\begin{array}{c} H \\ \diagdown \\ \diagup \\ H \end{array} NCH_2CH_2S(CH_2)_8 \underset{\underset{CH_3}{|}}{\overset{\overset{OC_2H_5}{|}}{Si}} CH_3$$

The boiling point of the product was 135° to 145° C./0.25 mm. The product was recovered in a 40% yield. An I.R. scan of the product showed the typical amine peaks at 2.95 microns and 6.3 microns. The typical OC$_2$H$_5$ peaks at 9.2, 9.4 microns, and 10.5. The ≡Si—CH$_3$ peak at 8.0 microns and the —CH$_2$— at 6.9 microns. Upon hydrolysis of the material in water, the corresponding disiloxane was isolated having an I.R. scan showing the ≡SiOSi≡ absorption at 9.5 microns, with complete absence of ≡SiOC$_2$H$_5$ absorption.

Example 3

A reaction mixture consisting of 36.4 grams of mercaptoethyltrimethoxysilane, 10.4 grams of 1-methylethyleneimine and one-half ml. of a 40% aqueous solution of benzyltrimethylammonium hydroxide was heated to reflux, 80°–110° C. The reaction mixture was maintained at reflux for 4 hours. An additional quantity, 3.8 grams, of 1-methylethyleneimine was then added and the reaction mixture was maintained at reflux for an additional two hours. The product of the reaction was beta-(methylaminoethylthio)ethyltrimethoxysilane of the formula:

$$\underset{|}{\overset{H}{\phantom{|}}} CH_3NCH_2CH_2SCH_2CH_2Si(OCH_3)_3$$

The yield of product produced by fractionation was 70%. An I.R. scan of the product showed the typical amine peaks at 2.9 microns and 6.3 microns. A VPC analysis showed the product to have a purity in the order of 99%.

Example 4

A reaction mixture consisting of 23.5 grams of mercaptopropyltriethoxysilane, 7.0 grams of 2 - ethylethyleneimine and 1 gram of sodium ethoxide was heated to reflux 80°–110° C. and maintained at reflux for 4 hours. An additional quantity, 3.5 grams, of 2-ethylethyleneimine was then added and the reaction mixture was maintained at reflux for an additional two hours. Fractionation yielded the product gamma-(2′-amino-n-butylthio)propyltriethoxysilane of the formula:

$$\begin{array}{c} H \\ \diagdown \\ \diagup \\ H \end{array} NCHCH_2SCH_2CH_2CH_2Si(OC_2H_5)_3 \\ \phantom{xxx}|\\ \phantom{xxx}CH_2-CH_3$$

The product was recovered in a 60% yield. An I.R. scan of the product showed the typical amine peaks at 2.95, 3.1 and 6.3 microns.

Example 5

To 400 grams of a compound having the average formula:

$$HO(\underset{\underset{CH_3}{|}}{\overset{\overset{CH_3}{|}}{Si}}O)_{300}H$$

was added 40 grams of gamma-(aminoethylthio)propyltrimethoxysilane. There was an exotherm indicating coreaction and condensation. To the reaction product was added 1 grams of water to provide further condensation as was shown by an increase in viscosity.

The silicone copolymer formed by the above reaction was used to make a car polish. This was accomplished by forming first a dispersion of 80 grams of the fluid in 150 grams of mineral spirits and 150 grams of a high flash naphtha having a boiling range of 240°–290° F. A second formulation was made by first adding 0.5 gram of a solid high molecular weight carboxyvinyl polymer containing an average of 1,000 carboxyvinyl units per molecule and one acid carboxy group per vinyl radical to 49.5 ml. of water with rapid high shear agitation. To this was added 50 grams of an aqueous 1% triethanolamine solution, 10 grams of morpholine and 410 grams of water.

The formulation containing the copolymer was then mixed with the formulation containing the carboxyvinyl polymer with rapid high shear agitation until a uniform mixture was obtained. Then, with rapid high shear agitation, 100 grams of diatomaceous earth was added. The agitation was continued until a uniform blend was obtained. The composition was tested on a standard black enamel test panel and found to provide exceptionally good gloss, good rub-out and a smooth, transparent, exceptionally clear, non-tacky, detergent resistant surface.

What I claim as new and desire to secure by Letters Patent of the United States is:

1. A method of making a compound within the scope of the formula:

$$\begin{array}{c} R' \\ \diagdown \\ \diagup \\ H \end{array} NCR'_2CR'_2S(CH_2)_nSi(OR'')_{3-a} \overset{R_a}{\phantom{x}}$$

which comprises reacting a compound of the formula:

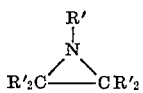

with a mercaptoalkylsilane of the formula:

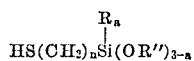

in the presence of a basic catalyst, where R is an organic radical attached to silicon by a C—Si linkage and is selected from the class consisting of alkyl radicals, cycloalkyl radicals, aryl radicals, aralkyl radicals, halogenated derivatives of the above radicals, and cyanoalkyl radicals, R' is a radical selected from the class consisting of H and R radicals, R'' is a radical selected from the group consisting of lower alkyl radicals having 1 to 7 carbon atoms, mononuclear aryl radicals and halogenated derivatives thereof, $a$ has a value of 0 to 2, and $n$ is an integer having a value of 1 to 10.

2. The method of claim 1 where R' is H.

3. The method of claim 1 wherein R is a methyl radical, R' is H, R'' is a methyl radical, $a$ has a value of 0 and $n$ has a value of 3.

References Cited

UNITED STATES PATENTS

| | | | |
|---|---|---|---|
| 3,033,815 | 5/1962 | Pike et al. | 260—448.2 XR |
| 3,068,153 | 12/1962 | Morehouse | 260—448.2 XR |
| 3,085,908 | 4/1963 | Morehouse et al. | 260—448.2 XR |
| 3,088,847 | 5/1963 | Pines | 260—448.2 XR |
| 3,234,178 | 2/1966 | Sellers | 260—448.2 XR |
| 3,288,754 | 11/1966 | Green | 260—448.2 XR |
| 3,321,350 | 5/1967 | Fekete | 260—448.2 XR |
| 3,392,182 | 7/1968 | Koerner | 260—448.8 |

DELBERT E. GANTZ, Primary Examiner

P. F. SHAVER, Assistant Examiner

U.S. Cl. X.R.

106—3; 260—448.8